(12) United States Patent
Gorti et al.

(10) Patent No.: US 11,640,733 B2
(45) Date of Patent: May 2, 2023

(54) AUTONOMOUS DRIVING SYSTEM COMPONENT FAULT PREDICTION

(71) Applicant: Tesla, Inc., Austin, TX (US)

(72) Inventors: Atchyuth Gorti, Austin, TX (US); David Glasco, Austin, TX (US); Daniel William Bailey, Austin, TX (US)

(73) Assignee: Tesla, Inc., Austin, TX (US)

( * ) Notice: Subject to any disclaimer, the term of this patent is extended or adjusted under 35 U.S.C. 154(b) by 158 days.

(21) Appl. No.: 16/954,755

(22) PCT Filed: Dec. 5, 2018

(86) PCT No.: PCT/US2018/063996
§ 371 (c)(1),
(2) Date: Jun. 17, 2020

(87) PCT Pub. No.: WO2019/125762
PCT Pub. Date: Jun. 27, 2019

(65) Prior Publication Data
US 2020/0320807 A1    Oct. 8, 2020

Related U.S. Application Data

(60) Provisional application No. 62/610,188, filed on Dec. 23, 2017.

(51) Int. Cl.
*G07C 5/08* (2006.01)
*G06N 20/00* (2019.01)
*B60W 60/00* (2020.01)

(52) U.S. Cl.
CPC ......... *G07C 5/0816* (2013.01); *B60W 60/001* (2020.02); *G06N 20/00* (2019.01); *G07C 5/0808* (2013.01)

(58) Field of Classification Search
CPC .... G07C 5/0816; G07C 5/0808; G07C 5/006; G06N 20/00; B60W 60/001; G05B 23/0283; G05B 23/0235
See application file for complete search history.

(56) References Cited

U.S. PATENT DOCUMENTS 6,301,531 B1    10/2001 Pierro et al.
10,395,444 B1 *  8/2019 Edren .................. G07C 5/0808
(Continued)

FOREIGN PATENT DOCUMENTS

WO    WO 06/110786    10/2006

OTHER PUBLICATIONS

Xiong et al., Jun. 2008, Prognostic and warning system for power-electronic modules in electric, hybrid electric, and fuel-cell vehicles, IEEE Transactions on Industrial Electronics, 55(6):2268-2276.
(Continued)

*Primary Examiner* — Ernest G Tacsik
(74) *Attorney, Agent, or Firm* — Knobbe, Martens, Olson & Bear, LLP

(57) ABSTRACT

A vehicular autonomous driving system includes a fault prediction unit, including a processor and memory, configured to predict a potential future fault condition by: monitoring performance data associated with the plurality of autonomous driving components; comparing the performance data associated with the plurality of autonomous driving components to a plurality of performance thresholds; and determining the potential future fault condition for one of the plurality of autonomous driving components, when the performance data associated with the one of the plurality of autonomous driving components compares unfavorably to a corresponding one of the plurality of performance thresholds.

20 Claims, 11 Drawing Sheets

(56) References Cited

U.S. PATENT DOCUMENTS

| | | |
|---|---|---|
| 2009/0254240 A1 | 10/2009 | Olsen et al. |
| 2010/0049403 A1 | 2/2010 | Gillman et al. |
| 2011/0071679 A1 | 3/2011 | Barajas et al. |
| 2012/0083959 A1 | 4/2012 | Dolgov et al. |
| 2014/0166168 A1 | 6/2014 | Engel |
| 2015/0112504 A1* | 4/2015 | Binion .................. G07C 5/008 701/1 |
| 2015/0344039 A1 | 12/2015 | Amoh |
| 2016/0035150 A1 | 2/2016 | Barfield |
| 2016/0217627 A1 | 7/2016 | Khalaschi |
| 2017/0185078 A1* | 6/2017 | Weast ..................... H04W 4/80 |
| 2018/0276913 A1* | 9/2018 | Garcia ................. B60L 3/0046 |
| 2019/0108692 A1* | 4/2019 | Du ........................ B60W 50/14 |
| 2019/0130669 A1* | 5/2019 | Boggio ................. G06T 11/206 |
| 2019/0154453 A1* | 5/2019 | Leone .................. G05D 1/0088 |
| 2019/0176639 A1* | 6/2019 | Kumar .................. B60L 3/0046 |
| 2019/0197795 A1* | 6/2019 | Mondello .............. G07C 5/008 |

OTHER PUBLICATIONS

International Search Report and Written Opinion dated Aug. 27, 2019 in PCT/US2018/063996.

* cited by examiner

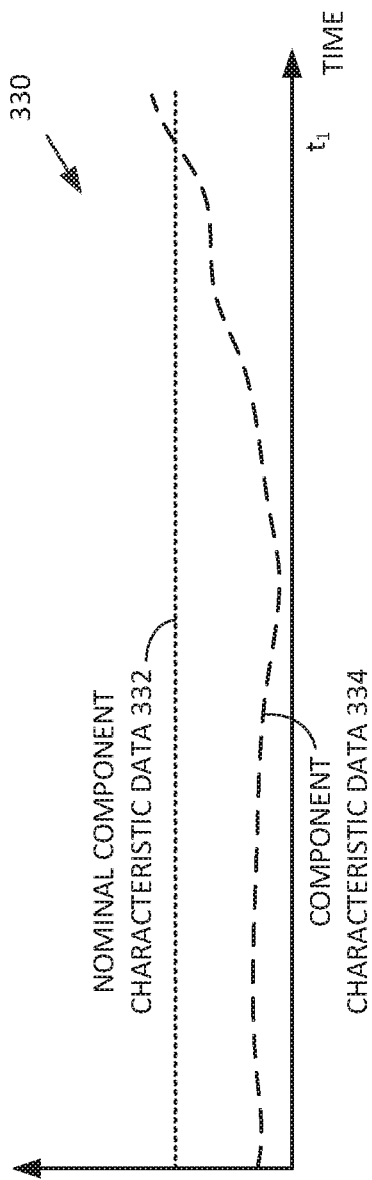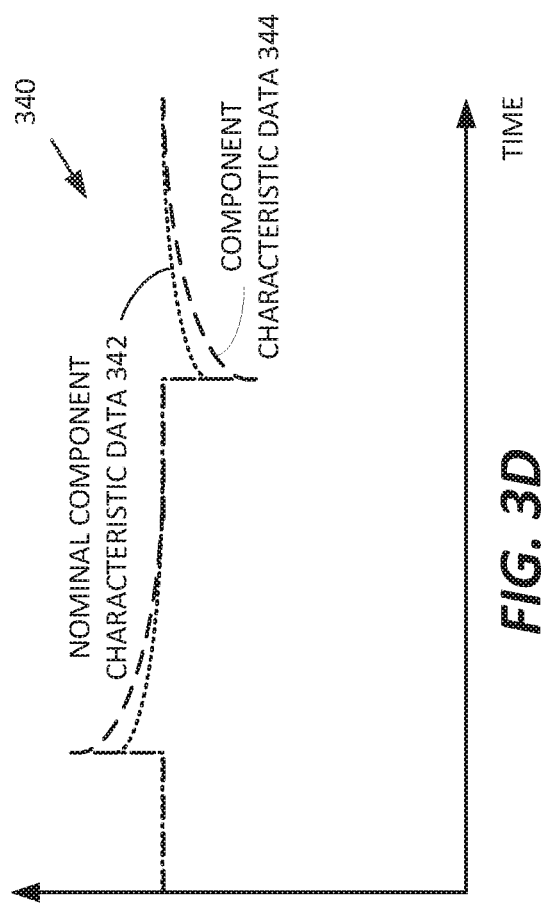
FIG. 3C
FIG. 3D

| COMPONENT NO. | IMPORTANCE | LIKELIHOOD | EXPECTED LIFE |
|---|---|---|---|
| 0001 | high | 25% | 1925 hrs |
| 0002 | medium | 60% | 425 hrs |
| ••• | ••• | ••• | ••• |

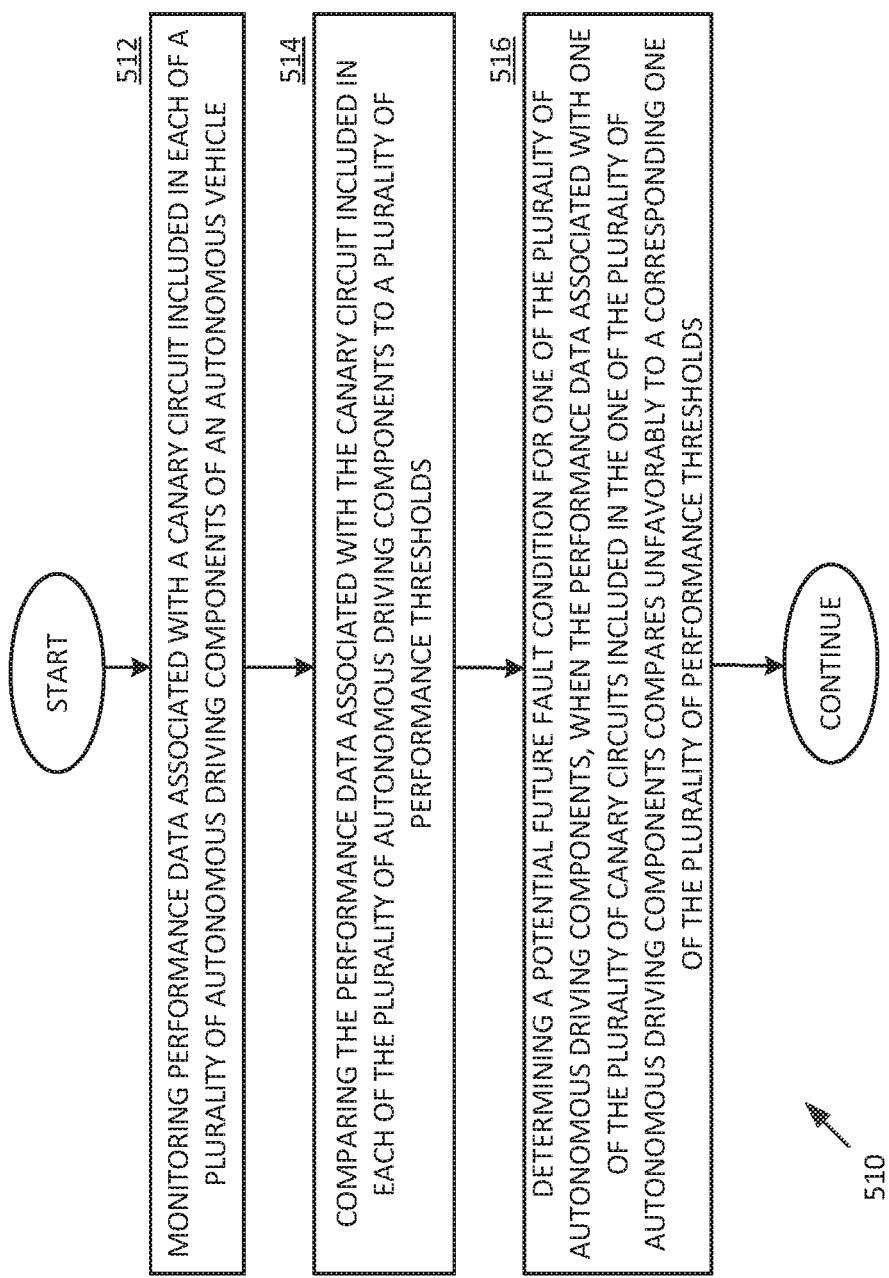

AUTONOMOUS DRIVING SYSTEM COMPONENT FAULT PREDICTION

BACKGROUND

Technical Field

The present invention relates to the autonomous driving of a vehicle; and more particularly to prediction of faults in autonomous driving components within the vehicle.

Description of Related Art

Self-driving vehicles are generally known to include a plurality of sensors, e.g., RADAR sensors, and LIDOR sensors, cameras, and sonic proximity detectors, among other types of data capturing components. The data captured by these sensors is communicated to a central processor, which processes the data to assist in making autonomous driving decisions, e.g., braking, accelerating, steering changes, etc. that are implemented by corresponding drive units of the vehicle. Such autonomous driving decisions may be performed while the vehicle is self-driving or when the driver of the vehicle is being assisted, e.g., emergency braking, driver notification, etc.

SUMMARY

A vehicular autonomous driving system includes a fault prediction unit configured to predict a potential future fault condition by: monitoring performance data associated with a plurality of autonomous driving components; comparing the performance data associated with the plurality of autonomous driving components to a plurality of performance thresholds; and determining the potential future fault condition for one of the plurality of autonomous driving components, when the performance data associated with the one of the plurality of autonomous driving components compares unfavorably to a corresponding one of the plurality of performance thresholds.

A vehicular autonomous driving system includes a fault prediction unit configured to predict a potential future fault condition by: monitoring performance data associated with a canary circuit included in each of a plurality of autonomous driving components; comparing the performance data associated with the canary circuit included in each of the plurality of autonomous driving components to a plurality of performance thresholds; and determining the potential future fault condition for one of the plurality of autonomous driving components, when the performance data associated with one of the canary circuits included in the one of the plurality of autonomous driving components compares unfavorably to a corresponding one of the plurality of performance thresholds.

A vehicular autonomous driving system includes a fault prediction unit configured to predict a potential future fault condition by: monitoring life accelerating events data associated with the plurality of autonomous driving components; updating an expected component life associated with the plurality of autonomous driving components; and determining the potential future fault condition of one of the plurality of autonomous driving components based on when a service time of the one of the plurality of autonomous driving components exceeds the expected component life associated with the one of the plurality of autonomous driving components.

Benefits of the disclosed embodiments will become apparent from reading the detailed description below with reference to the drawings.

BRIEF DESCRIPTION OF THE SEVERAL VIEWS OF THE DRAWINGS

FIG. 3C is a temporal diagram illustrating component characteristic data according to one or more described embodiments.

FIG. 3D is a temporal diagram illustrating component characteristic data according to one or more described embodiments.

FIG. 5B is a flow diagram illustrating a method according to one or more described embodiments.

DETAILED DESCRIPTION OF THE DISCLOSURE

Figure 1:
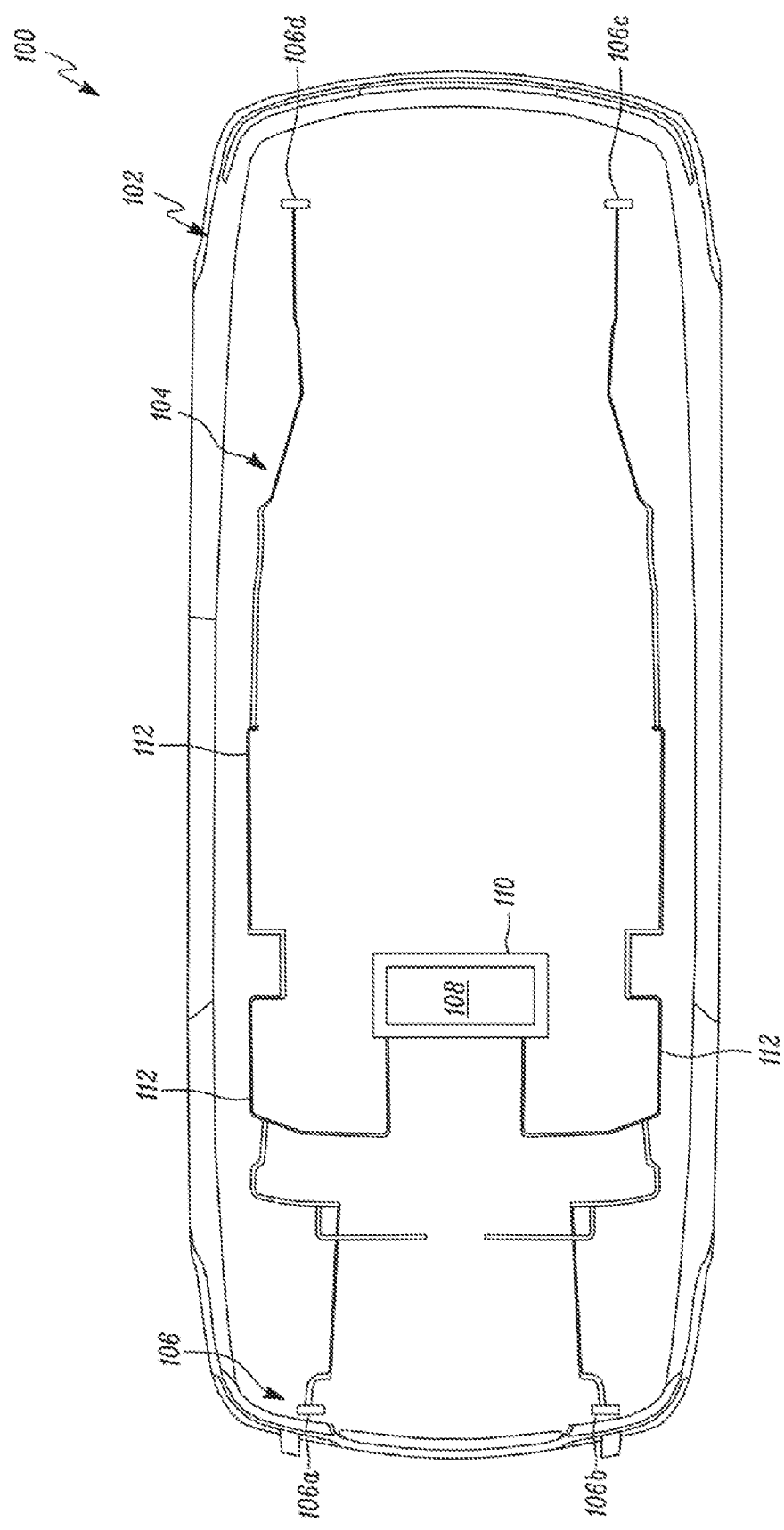
FIG. 1 is a diagram illustrating a vehicle having a vehicular autonomous driving system constructed and operating according to various embodiments.

FIG. 1 is a diagram illustrating a vehicle having a vehicular autonomous driving system constructed and operating according to a described embodiment. An automobile 100 that includes the vehicular autonomous driving system has a body 102 and a wiring system 104 for connecting a plurality of autonomous driving sensors 106a-106d to an autonomous driving controller 108. The wiring system 104 of FIG. 1 includes a structural cable 112 or other wiring. The autonomous driving controller 108 may reside on or in or be co-located with an infotainment device 110. The infotainment device 110 may be used to control functions of various components present in the automobile 100, e.g., to take over control of a steering function associated with a steering system (not shown) of the automobile 100, a braking function, an acceleration function, or another function of the automobile 100 related to autonomous driving or collision prevention. These operations of the infotainment device 110 are performed based upon interaction with the autonomous driving controller 108.

Figure 2:
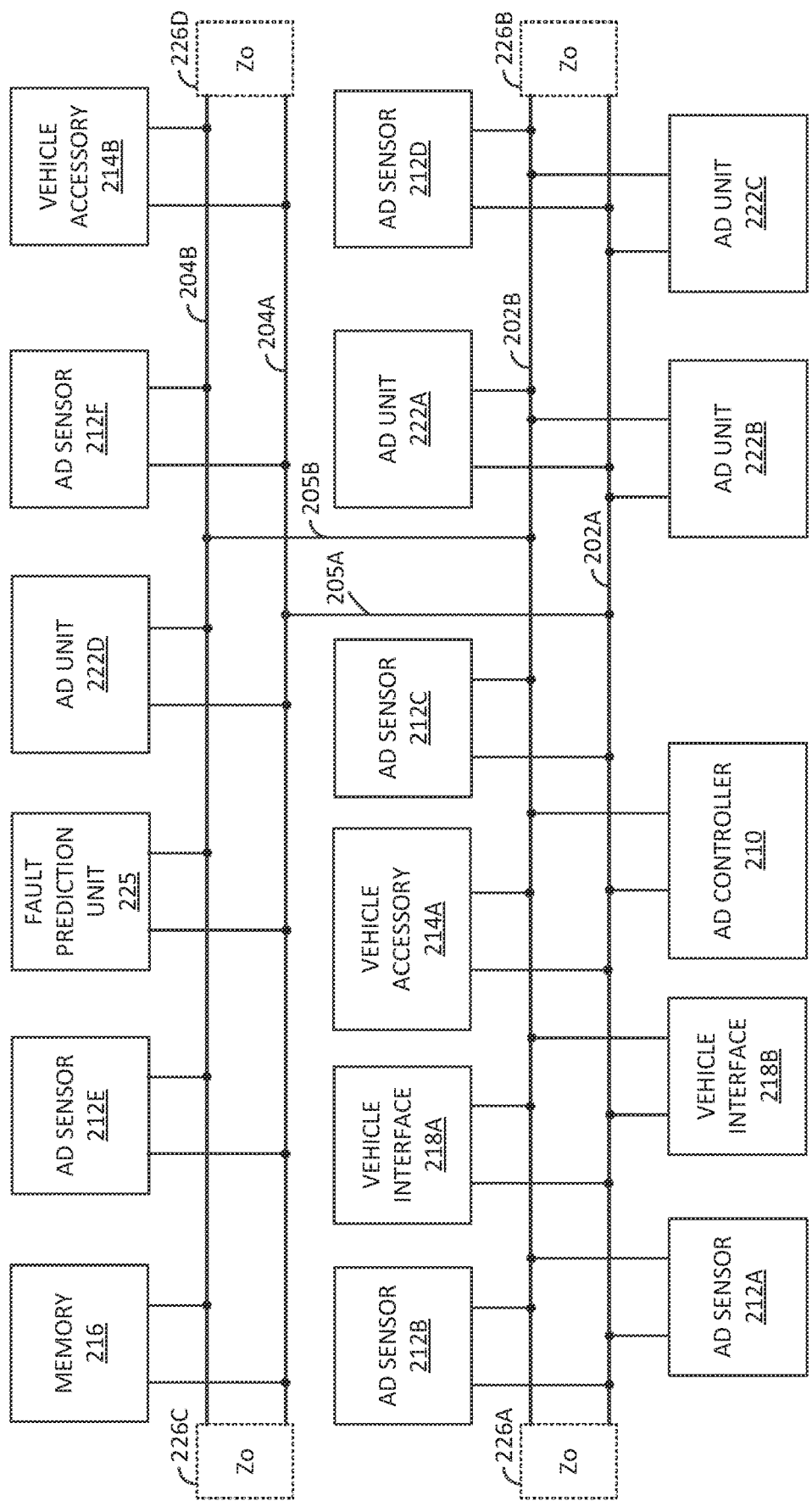
FIG. 2 is a block diagram illustrating a vehicular autonomous driving system constructed and operating according to various embodiments.

The autonomous driving sensors 106a-106d include cameras, RADAR sensors, LIDAR sensors, sonic proximity sensors, or other sensors that collect information relevant to the operation of the automobile 100. For example, autonomous driving sensors 106a, 106b could be cameras while autonomous driving sensors 106c, 106d could be RADAR sensors. The autonomous driving sensors 106a-106d are communicatively connected to the autonomous driving controller 108 via the structural cable 112. The structural cable 112 may include a single conductor or a pair of conductors and may be twisted pair wiring, coaxial wiring, single conductor wiring, a power bus or wiring, strip wiring, or other wiring. When the structural cable 112 includes two or more conductors, as is illustrated in FIG. 2, communications supported by the structural cable 112 may be differential, which causes the communications to be more resistance to noise generated within the automobile 100. When the structural cable 112 includes only a single conductor, communications supported by the structural cable 112 are single ended with the chassis of the automobile 100 or other metallic portion of the automobile 100 serving as a common ground.

According to a number of embodiments described herein, the autonomous driving sensors 106a, 106b, 106c, and 106d (and other components coupled to the structural cable 112) communicate with the autonomous driving controller 108 in a Time Division Multiplexed (TDM) fashion, i.e., each autonomous driving sensor 106a-106d or other device coupled to the structural cable has access to the structural cable 112 during respective assigned time slots, however other multiple access techniques can likewise be employed. The terms "structural cable" and "TDM bus" are both used herein to describe one or more communication paths that communicatively intercouple communication devices within the automobile 100. Further, the terms "TDM bus time slot" and "time slot" will be used interchangeably herein. The teachings presented herein may also be applied to differing vehicles as well, e.g., boats, trucks, aerial vehicles and/or other vehicles that support autonomous movement.

The communications serviced within the automobile 100 via the structural cable 112 may operate consistently with a broadband Power Line Communication (PLC) operating standard as modified according to the present disclosure. Broadband PLC operating standards typically specify carrier frequencies of 1.8-250 MHz and support relatively high data rates up to hundreds of Mbps. Specifications for PLC include the Universal Powerline Association, SiConnect, the HD-PLC Alliance, Xsilon and the ITU-T's G.hn specifications. Other specifications, including the HomePlug AV and IEEE 1901 standards specify how data is supported. PLCs are designed to be robust in noisy environments. Vehicles, particularly electric vehicles, include components that create noise. The PLCs are wells suited to broadband communications within an automobile, considering their accommodation for noise on servicing conductor(s), however other communication protocols can be employed.

FIG. 2 is a block diagram illustrating a vehicular autonomous driving system 200 constructed and operating according to a described embodiment. The vehicular autonomous driving system 200 includes a TDM bus such as structural cable 112 or other bus structure. The vehicular autonomous driving system 200 also include an autonomous driving controller 210, such as autonomous driving controller 108 and a plurality of autonomous driving sensors 212A-212F, such as one or more radio direction and ranging (RADAR) units, one or more light direction and ranging (LIDAR) units, one or more cameras, one or more sonar devices, one or more proximity sensors and/or other sensing devices or autonomous driving sensors 106a-106d, that are coupled to communicate via the TDM bus.

In the embodiment of FIG. 2, the TDM bus includes two interconnected sections. A first section of the TDM bus includes conductors 202A and 202B that are terminated via terminations 226A and 226B to minimize reflections. A second section of the TDM bus includes conductors 204A and 204B that are terminated via terminations 226C and 226D to minimize reflections. Interconnecting conductors 205A and 205B intercouple the first and second sections of the TDM bus. The TDM bus may be a twisted pair of conductors, a pair of strip conductors, a coaxial conductor, a two conductor power bus that carries DC power, or another structure having two conductors to support TDM communications. Note that the communication connectivity via the TDM bus may be different in differing embodiments.

A plurality of devices communicates via the TDM bus. These devices include: the autonomous driving controller 210; a memory 216; the plurality of autonomous driving sensors 212A-212F; a plurality of autonomous driving units 222A-222D, such as an engine/motor control, steering control, brake control, battery control (e.g., when the vehicle is an electric vehicle or hybrid vehicle) and/or other autonomous drive unit that facilitates control of the movement of the vehicle under commands from the autonomous driving controller 210; a plurality of vehicle accessories 214A-214B, such as an infotainment device, a climate control device and/or other vehicle accessories; and a plurality interfaces 218A-218B, such as a wireless communication interface, a wired communication interface and/or a vehicle charging port (e.g., when the vehicle is an electric vehicle or plug-in hybrid vehicle) that further includes a wired interface and/or other interface for communicating vehicle diagnostics or other information with a diagnostics unit that is separate from the vehicle.

The memory 216 can be implemented using volatile memory, non-volatile memory, disk storage, and other memory storage including, for example, one or more memory controllers and/or other devices for interfacing the memory to the TDM bus, to mediate and authenticate access to the memory 216 and further to process ready and write commands to access data stored in the memory 216. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 216 can be used to store data including an operating system, utilities and other program code, one or more cache memories, buffers and/or other temporary data storage, program data, and other data stored and retrieved by the vehicular autonomous driving system.

A fault prediction unit 225 is also coupled to the TDM bus and can communicate with one or more of the other driving components such as the autonomous driving controller 210, the memory 216, the plurality of autonomous driving sensors 212A-212F, the plurality of autonomous driving units 222A-222D, the plurality of vehicle accessories 214A-214B, and/or the plurality interfaces 218A-218B. The fault prediction unit 225 is configured to predict a potential future fault condition by:

(a) monitoring performance data associated with each of the plurality of autonomous driving components;
(b) comparing the performance data associated with each of the plurality of autonomous driving components to a corresponding one of the plurality of performance thresholds; and
(c) determining the potential future fault condition for one of the plurality of autonomous driving components, when the performance data associated with that one of the autonomous driving components compares unfavorably to the corresponding one of the performance thresholds.

An indication of the potential future fault condition can be used to generate a fault message on the infotainment system, dashboard display or other vehicle system. In addition or in the alternative, an indication of the potential future fault condition can be transmitted to a diagnostic unit associated with the operator of the vehicle or a service technician via a wireless communication link, a charging port of the vehicle or other wired or wireless interface 218A-B. In this fashion, the indication of the potential future fault condition can be used to repair or replace an autonomous driving component before a failure occurs that might adversely impact the operation of the vehicle.

Performance data associated with each of the plurality of autonomous driving components can be generated by each monitored component and sent to the fault prediction unit 225 via the TDM bus or via other wired or wireless connections. The performance data can be simple input/output data for each component that is generated in the ordinary course of operation of the vehicular autonomous driving system and monitored by the fault prediction unit 225 for potential abnormalities. In addition or in the alternative, the performance data can include other diagnostic or status data generated by an autonomous driving component and sent to the fault prediction unit 225 for the purposes of monitoring. One or more autonomous driving components can include a canary circuit that generates performance data and is designed specifically to fail before other portions of the component itself. Canary circuits can be ring oscillators, memory devices, logic circuits or other standard functional blocks of a system on a chip or other component that are implemented entirely for fault prediction and not used in normal operations of the autonomous component. In particular, the canary circuits can be designed as the least reliable circuit in the design or otherwise with less robustness than ordinary circuit blocks of the autonomous driving component so as to increase the likelihood that the canary circuit will fail before the other portions of the autonomous driving component. In this fashion, degradation of performance of the canary circuit and/or failure can be used to predict the potential future failure of one or more remaining portions of the autonomous driving component that are used in normal operation of the vehicular autonomous driving system.

In various embodiments, the performance data can include: a hardware-specific characteristic, such as a frequency, frequency stability, frequency drift, current draw, voltage droop, hardware resets, memory errors and other hardware-specific characteristics; software-specific characteristics such as exception reports, stack overflows, stack traces, and/or hardware/software errors such as analog to digital converter errors, communication errors, error control coding errors, time-out errors and/or other component characteristic data.

In various embodiments, the performance data associated with the plurality of autonomous driving components includes component characteristic data measured over time. Comparing the performance data associated the plurality of autonomous driving components to a corresponding performance threshold can include:

(a) determining a deviation between component characteristic data measured over time and corresponding nominal characteristic data; and
(b) comparing the deviation between the component characteristic data measured over time and the corresponding nominal characteristic data to the corresponding performance threshold.

The nominal component characteristic data can be a scalar quantity, such as a numerical value or other scalar quantity, a vector quantity such as a time signature or other vector quantity, depending on the form of the component characteristic data that is used to characterize normal performance and otherwise used to predict the potential for future component failure. The nominal component characteristic data of monitored components may be established initially and prestored in the fault prediction unit 225. Alternatively, the nominal characteristic data can determined over time based upon collected performance data. For example, the fault prediction unit 225 can operate via machine learning to derive the nominal characteristic data to more closely match the actual components and performance of the vehicular autonomous driving system.

In various embodiments, the performance thresholds can be predetermined based on an amount of likelihood that an amount of deviation between the component characteristic data measured over time and the corresponding nominal characteristic data indicates a future fault in the corresponding autonomous driving component. The amount of likelihood can be set based on a relative importance of the at least one of the plurality of autonomous driving components to autonomous driving. For example, a performance threshold can be determined to indicate a potential future failure when the likelihood of future fault is high for an unimportant autonomous driving component such as a climate control component, redundant memory or processing components. For other autonomous driving components, another performance threshold can be determined to indicate a potential future failure when the likelihood of future fault is more moderate. For mission critical autonomous driving components, such as the autonomous driving controller, LIDAR or RADAR components, braking and steering components, etc., a performance threshold can be determined to indicate a potential future failure even when the likelihood of future fault is low, given the relative importance of these components to autonomous driving.

While the foregoing discussion has focused on determining a potential future fault condition based on performance data associated with autonomous driving components, other criteria can also be employed. In addition, or in the alternative, the fault prediction unit 225 can be configured to predict a potential future fault condition by:

(a) monitoring life accelerating events data associated with the plurality of autonomous driving components;
(b) updating an expected component life associated with the plurality of autonomous driving components; and
(c) determining the potential future fault condition of one of the plurality of autonomous driving components based on when a service time of the one of the plurality of autonomous driving components exceeds the expected component life associated with the one of the plurality of autonomous driving components.

In various embodiments, the life accelerating events data includes an indication of one of a plurality of life accelerating events and an indication of one or more of the plurality of autonomous driving components associated with the life accelerating event. For example, the life accelerating events data can include an indication of life accelerating events such as an over-voltage condition, a voltage spike, a current spike, a high operating temperature, a low operating temperature, and or an indication of other events that can potentially shorten the life of an autonomous driving component. Furthermore, updating the expected component life associated with the plurality of autonomous driving components includes decreasing the expected component life associated with a selected one of the plurality of autonomous driving components in response to the life accelerating events data indicating a life accelerating event associated with the selected one of the plurality of autonomous driving components.

In addition, or in the alternative, the fault prediction unit 225 can be configured to predict a potential future fault condition by executing a stress test on a particular autonomous driving component either periodically or in response to determining a potential future fault condition by other methods previously discussed. Stress testing can be implemented periodically or solely during off-line times when the vehicle is not in operation. Furthermore, stress testing can be triggered as a final verification in response to the expiration of expected component life, canary circuit indication or an indication during normal testing of a potential issue. Poor performance in stress testing can be the final indicator that replacement or repair is indicated. For example, the stress test can be executed when the service time of an autonomous driving component exceeds the expected component life associated with that autonomous driving components. The stress test can involve stressing the particular autonomous driving component by applying a higher operating frequency or an over-voltage condition or other component stress condition and can be used to generate stress test results, such as any of the performance data previously described. The fault prediction unit 225 can compare the stress test results to a stress test threshold and determine the potential future fault condition of one of the plurality of autonomous driving components further based on a determination that the stress test results compare unfavorably to the stress test threshold.

Further operations of the fault prediction unit 225 and the other autonomous driving components of the vehicular autonomous driving system, including several optional functions and features, will be described further in conjunction with FIGS. 3A-3F, 4A-4E and 5A-5C that follow.

Figure 3B:
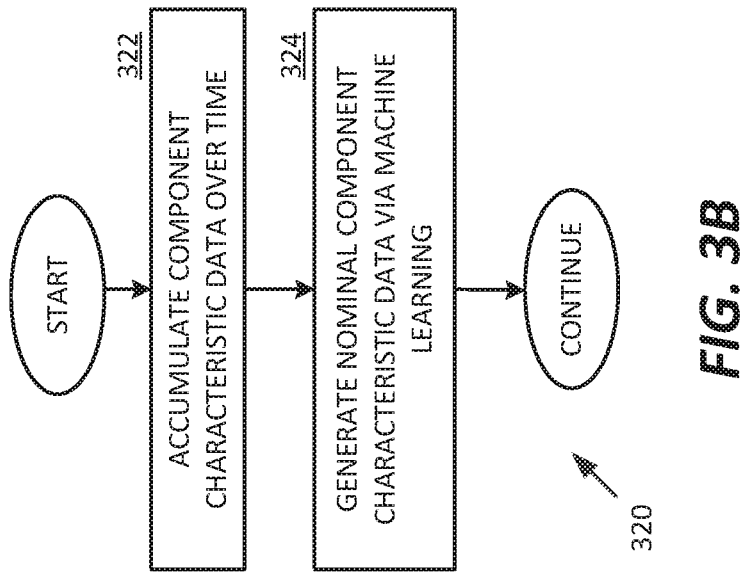
FIG. 3B is a flow diagram illustrating a method according to one or more described embodiments.
Figure 3A:
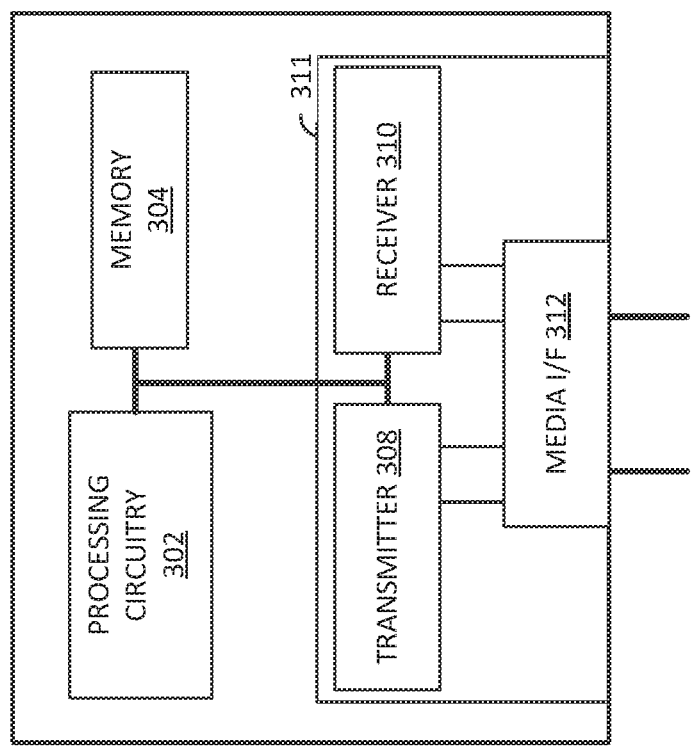
FIG. 3A is a block diagram illustrating a fault prediction unit constructed and operating according to various embodiments.

FIG. 3A is a block diagram illustrating a fault prediction unit 225 constructed and operating according to various embodiments. The fault prediction unit 225 includes processing circuitry 302, memory 304, and a transceiver 311 coupled to the processing circuitry 302, and to the memory 304 via a bus. The processing circuitry 302 executes programs stored in memory 304, e.g., performing any and all of the functions and features of fault prediction unit 225 described herein. Furthermore processing circuitry 302 performs reads and writes of data from/to memory 304, e.g., data and instructions to support fault prediction operations including the monitoring and processing of performance data and life accelerating events data, and generating data indicating potential future fault conditions. The processing circuitry 302 interacts with the transceiver 311 to communicate via the TDM bus, to support these functions and features along with other operations.

By way of example and not limitation, processing circuitry 302 may be a central processing unit, a microcontroller, a digital signal processor, an application specific integrated circuit, a Judging unit, a Determining Unit, an Executing unit, combinations of any of the foregoing, or any other device suitable for execution of computer programs. By way of example, memory 304 may be dynamic memory, static memory, disk drive(s), flash drive(s), combinations of any of the foregoing, or any other form of computer memory. The memory 304 stores computer programs for operations of the present disclosure, may also store other computer programs, configuration information, and other short-term and long-term data necessary for implementation of the embodiments of the present disclosure.

The transceiver 311 includes a transmitter 308, a receiver 310, and a media I/F 312. The media I/F 312 may be a transmit/receive (T/R) switch, a duplexer, or other device that supports the illustrated coupling. In other embodiments, both the transmitter 308 and receiver 310 couple directly to the TDM bus or couple to the TDM bus other than via the media I/F 312.

FIG. 3B is a flow diagram 300 illustrating a method according to one or more described embodiments. In particular a method is presented for use in generating the nominal component characteristic data discussed in conjunction with FIG. 2. As previously discussed, the nominal characteristic data can determined over time by the fault prediction unit 225 based upon collected performance data for the various autonomous driving components. In step 322, performance data, in the form of component characteristic data, is accumulated over time. The component characteristic data can be a signature over time, time-varying function or other distribution over time of measurements such as voltage, voltage droop, current, frequency, voltage droop, ADC errors, DAC errors, communication errors, ECC errors, exception reports, stack overflows, buffer overflows, re-buffering events, time-out conditions and/or other measurable aspects of any of the autonomous driving components of vehicular autonomous driving system 200 that is processed as vectorized data for each autonomous driving component. It should be noted that a single autonomous driving component can have component characteristic data of multiple types, depending on the type of component.

In step 324, nominal component characteristic data is generated via machine learning for each of the corresponding autonomous driving components. The fault prediction unit 225 can operate by performing a learning algorithm on the component characteristic data in order to generate the nominal component characteristic data for each of the autonomous driving components, for example, as model parameter data of a corresponding learning model. In various embodiments, the model parameter data can be either a scalar quantity or a vector quantity and the learning model can be a time signature, boundary value or other model. While a convolutional neural network is a preferred embodiment, the learning model can additionally or alternatively include one or more of a Bayesian model, a support vector machine model, a cluster analysis model, statistical modelling or other supervised or unsupervised learning model.

In this fashion, the fault prediction unit 225 can compare the nominal component characteristic data to the current component characteristic data to predict a potential future fault by, for example, computing a vector distance such as the Euclidian distance, or squared Euclidian distance, between the nominal component characteristic data and the current component characteristic data, and/or determining an average output error such as an average Euclidian distance or squared Euclidian distance if multiple input feature vectors were employed.

FIG. 3C is a temporal diagram 330 illustrating component characteristic data according to one or more described embodiments. In the example shown, the component characteristic data 334 is a measurement over time of a quantity such as current draw of an autonomous driving component, such as a proximity sensor. The nominal component characteristic data 332, in this case, is a scalar quantity that provides a boundary value of expected current draw for this component derived from statistical modelling. In particular, the boundary value of the nominal component characteristic data 332 can be derived based on a statistical confidence that the component characteristic data 334 of a normal component will not exceed the limit and/or a likelihood that, a component drawing a current that exceeds this boundary value could begin to fail. As previously discussed, the particular level of likelihood used can be based on the importance of the particular autonomous driving component.

Consequently, when comparison of the component characteristic data 334 to the nominal component characteristic data 332 indicates that the measured current draw begins to exceed the boundary value at time $t_1$, the fault prediction unit 225 can indicate a potential future fault for this particular autonomous driving component.

FIG. 3D is a temporal diagram 340 illustrating component characteristic data according to one or more described embodiments. In the example shown, the component characteristic data 334 is a measurement over time of a quantity such as voltage droop of an autonomous driving component, such as a power supply. The nominal component characteristic data 342, in this case, is a vector quantity that provides a time signature of expected voltage for this component derived from machine learning.

In this instance, the component characteristic data 334 can be compared to the nominal component characteristic data 342 by computing a deviation metric, such as a sum of squared error between these time signatures. A performance threshold for this deviation can be established based on a likelihood, for example, that a component having component characteristic data 344 deviating by more than this amount from the nominal component characteristic data 342 is expected to fail within a predetermined time frame. As previously discussed, the particular level of likelihood used can be based on the importance of the particular autonomous driving component.

When the deviation between the component characteristic data 344 and the nominal component characteristic data 342 exceeds the performance threshold, the fault prediction unit 225 can indicate a potential future fault for this component. Otherwise, when the deviation between the component characteristic data 344 and the nominal component characteristic data 342 does not exceed the performance threshold, the fault prediction unit 225 can indicate normal operation for this particular autonomous driving component.

Figures 3E, 3F:
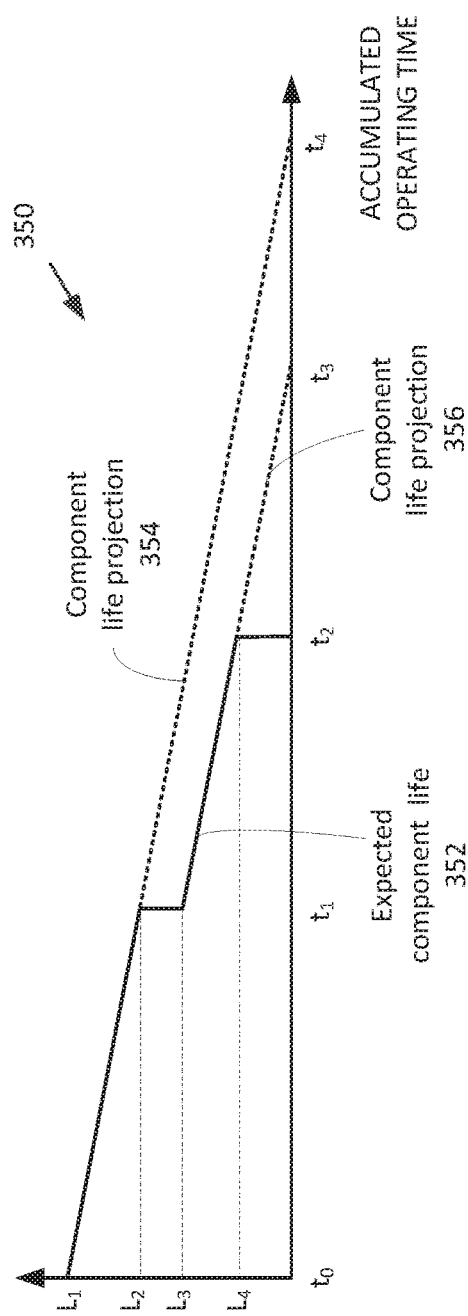
FIG. 3E is a temporal diagram illustrating expected component life according to one or more described embodiments.
FIG. 3F is a tabular diagram illustrating component data according to one or more described embodiments.

FIG. 3E is a temporal diagram 350 illustrating expected component life 352 according to one or more described embodiments. In the example shown, a particular autonomous driving component, at time $t_0$, has an expected component life of:

$$L_1 = t_4 - t_0$$

As the accumulated operating time (e.g. the service time) of the component progresses, from time $t_0$ to $t_1$, the component life projection 354 remains unaltered, projecting the expected component life to expire (reach zero) at time $t_4$.

At time $t_1$, a life accelerating event occurs, such as an over-voltage condition, a voltage spike, a current spike, a high operating temperature, a low operating temperature, and or another event that can potentially shorten the life of the autonomous driving component. At this point the expected component life 352 is decreased from $L_2$ to a lower expected life $L_3$, corresponding to the component life projection 356. In effect, the expected component life 352 is decreased by an amount $$L_2 - L_3 = t_4 - t_3$$

The amount of the expected component life 352 is decreased at $t_1$ can be determined based on the type and/or magnitude of the life accelerating event that occurs at time $t_1$ as well as the type of component. For example, the fault prediction unit can include a look-up table that correlates life accelerating events of different types and different magnitudes with the different types of components to generate an amount that the expected component life 352 is decreased for each kind of life accelerating event. As the accumulated operating time of the component progresses, from time $t_1$ to $t_2$, the component life projection 356 remains unaltered, projecting the expected component life to expire (reach zero) at time $t_3$.

At time $t_2$, another life accelerating event occurs, such as an over-voltage condition, a voltage spike, a current spike, a high operating temperature, a low operating temperature, and or another event that can potentially shorten the life of the autonomous driving component. The amount of the expected component life 352 is decreased at $t_2$ can also be determined based on the type and/or magnitude of the life accelerating event that occurs at time $t_2$. The amount of the decrease at $t_2$ is greater than or equal to the remaining life $L_4$. As a result, the expected component life 352 is decreased to zero and the expected component life expires.

FIG. 3F is a tabular diagram 360 illustrating component data according to one or more described embodiments. In particular, the fault prediction unit 225 maintains a database of other data structure that includes, for each autonomous driving component, a component number, importance, likelihood, and expected life along with other data previously described such as a learning model type and model parameters associated with the learning model, one or more performance thresholds and/or other nominal component characteristic data.

Figure 4B:
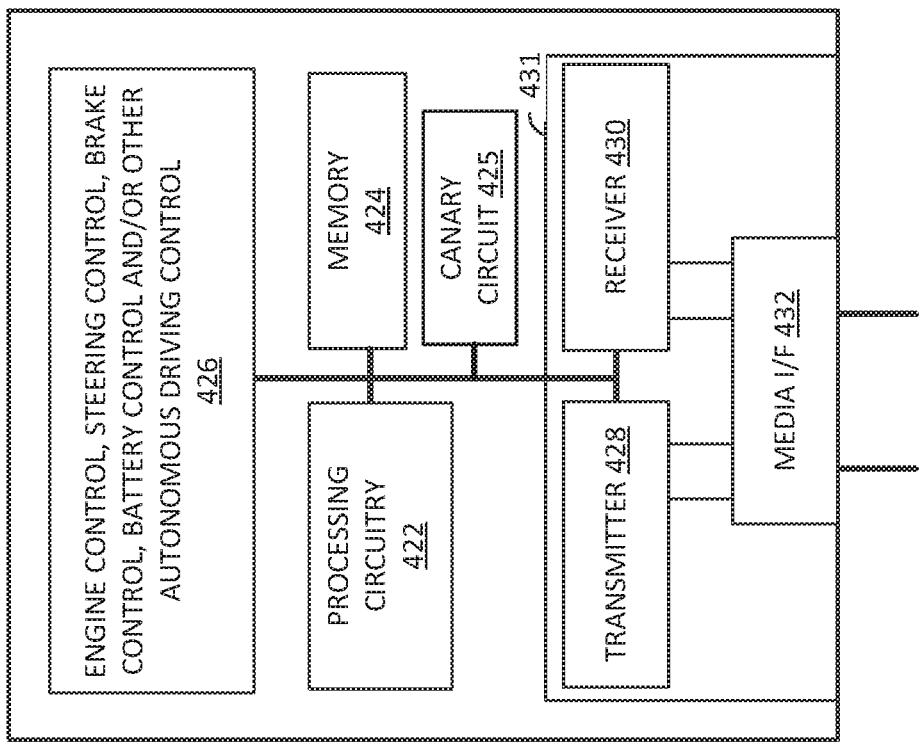
FIG. 4B is a block diagram illustrating an autonomous driving unit constructed according to a described embodiment.
Figure 4A:
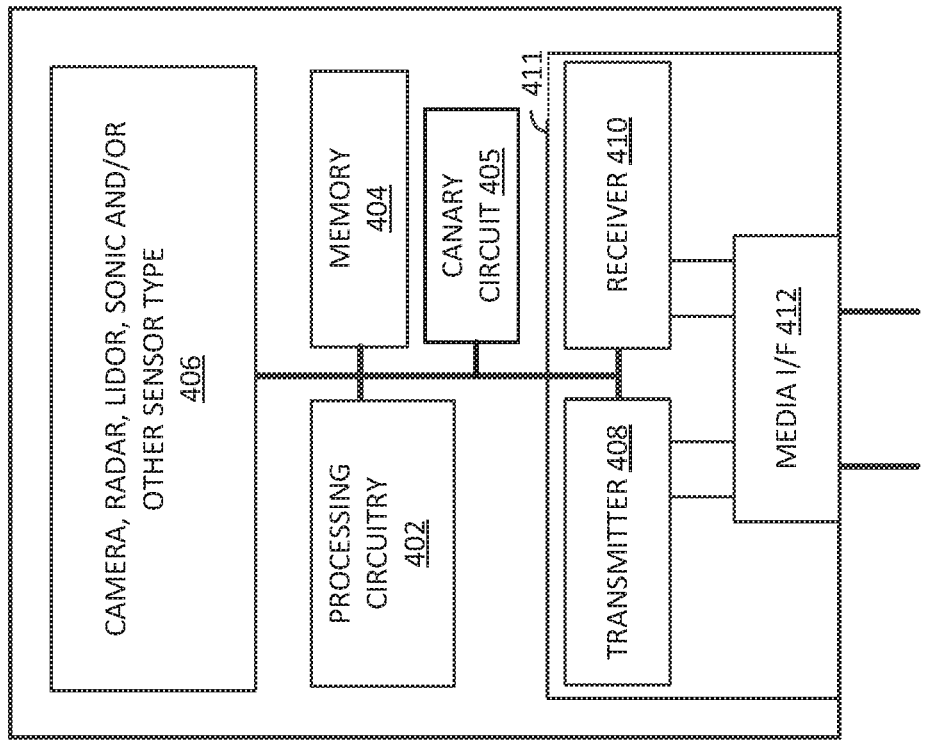
FIG. 4A is a block diagram illustrating an autonomous driving sensor constructed according to a described embodiment.

FIG. 4A is a block diagram illustrating an autonomous driving sensor constructed according to a described embodiment. The autonomous driving sensor 212 includes a data collection component 406 configured to collect autonomous driving data. The data collection component 406 may be any of the autonomous driving sensors 212A-212F such as a RADAR sensor, a LIDAR sensor, a sonic or other proximity sensor, or another type of sensor. The autonomous driving sensor 212 further includes processing circuitry 402, memory 404, canary circuit 405, and a transceiver 411 coupled to the processing circuitry 402, to the memory 404, and to the data collection component 406 via a bus. The processing circuitry 402 executes programs stored in memory 404, e.g., autonomous driving data collection, reads and writes data from/to memory 404, e.g., data and instructions to support autonomous driving operations, interacts with the data collection component 406 to control the collection and transmission of autonomous driving data and performance data for the various subcomponents of the autonomous driving sensor 212 including the canary circuit 405, processes the autonomous driving data, and interacts with the transceiver 411 to communicate via the TDM bus, among other operations.

As previously discussed, the canary circuit 405 can be a ring oscillator, memory device, logic circuit or other standard functional block of a system on a chip or sensor component that is implemented entirely for fault prediction and not used in normal operations of the autonomous driving sensor 212—but only for generating performance data for use by the fault prediction unit 225 in predicting a potential future fault. In particular, the canary circuit 405 can be designed as the least reliable circuit in the design or otherwise with less robustness than ordinary circuit blocks of the autonomous driving sensor 212 so as to increase the likelihood that the canary circuit 405 will fail before the other portions of the autonomous driving sensor 212. In this fashion, degradation of performance of the canary circuit 405 and/or failure can be used to predict the potential future failure of one or more remaining portions of the autonomous driving sensor 212 that are used in normal operation of the vehicular autonomous driving system 200. Furthermore, while the autonomous driving sensor 212 is shown as having a single canary circuit 405, the autonomous driving sensor 212 may have multiple canary circuits 405, for example, one or more canary circuits 405 associated with each of the various subcomponents of the autonomous driving sensor 212.

By way of example and not limitation, processing circuitry 402 may be a central processing unit, a microcontroller, a digital signal processor, an application specific integrated circuit, a Judging unit, a Determining Unit, an Executing unit, combinations of any of the foregoing, or any other device suitable for execution of computer programs. By way of example, memory 404 may be dynamic memory, static memory, disk drive(s), flash drive(s), combinations of any of the foregoing, or any other form of computer memory. The memory 404 stores computer programs for operations of the present disclosure, may also store other computer programs, configuration information, and other short-term and long-term data necessary for implementation of the embodiments of the present disclosure.

The transceiver 411 includes a transmitter 408, a receiver 410, and a media I/F 412. The media I/F 412 may be a transmit/receive (T/R) switch, a duplexer, or other device that supports the illustrated coupling. In other embodiments, both the transmitter 408 and receiver 410 couple directly to the TDM bus or couple to the TDM bus other than via the media I/F 412.

FIG. 4B is a block diagram illustrating an autonomous driving unit 222 constructed according to a described embodiment. The autonomous driving unit 222 includes a control component 426 configured to process autonomous driving commands from the autonomous driving controller 210 and to control the vehicle in response thereto. The control component 426 may be any of the autonomous driving units 222A-222D such as engine/motor control, steering control, brake control, battery control and/or other autonomous driving control. The autonomous driving unit 222 further includes processing circuitry 422, memory 424, canary circuit 425, and a transceiver 431 coupled to the processing circuitry 422, to the memory 424, and to the control component 426 via a bus. The processing circuitry 422 executes programs stored in memory 424, e.g., autonomous driving data controls, reads and writes data from/to memory 424, e.g., data and instructions to support autonomous driving operations, interacts with the control component 426 to control the operation of the vehicle and to control the collection and transmission of performance data for the various subcomponents of the autonomous driving controller 210 including the canary circuit 425, processes the autonomous driving commands and data, and interacts with the transceiver 431 to communicate via the TDM bus, among other operations.

The canary circuit 425 can be a ring oscillator, memory device, logic circuit or other standard functional block of a system on a chip or autonomous driving component that is implemented entirely for fault prediction and not used in normal operations of the autonomous driving unit 222—but only for generating performance data for use by the fault prediction unit 225 in predicting a potential future fault. In particular, the canary circuit 425 can be designed as the least reliable circuit in the design or otherwise with less robustness than ordinary circuit blocks of the autonomous driving unit 222 so as to increase the likelihood that the canary circuit 425 will fail before the other portions of the autonomous driving unit 222. In this fashion, degradation of performance of the canary circuit 425 and/or failure can be used to predict the potential future failure of one or more remaining portions of the autonomous driving unit 222 that are used in normal operation of the vehicular autonomous driving system 200. Furthermore, while the autonomous driving unit 222 is shown as having a single canary circuit 425, the autonomous driving unit 222 may have multiple canary circuits 425, for example, one or more canary circuits 425 associated with each of the various subcomponents of the autonomous driving unit 222.

By way of example and not limitation, processing circuitry 422 and memory 424 can be implemented similarly to processing circuit 402 and memory 404. The transceiver 431 includes a transmitter 428, a receiver 430, and a media I/F 432. The media I/F 432 may be a transmit/receive (T/R) switch, a duplexer, or other device that supports the illustrated coupling. In other embodiments, both the transmitter 428 and receiver 430 couple directly to the TDM bus or couple to the TDM bus other than via the media I/F 432.

Figure 4D:
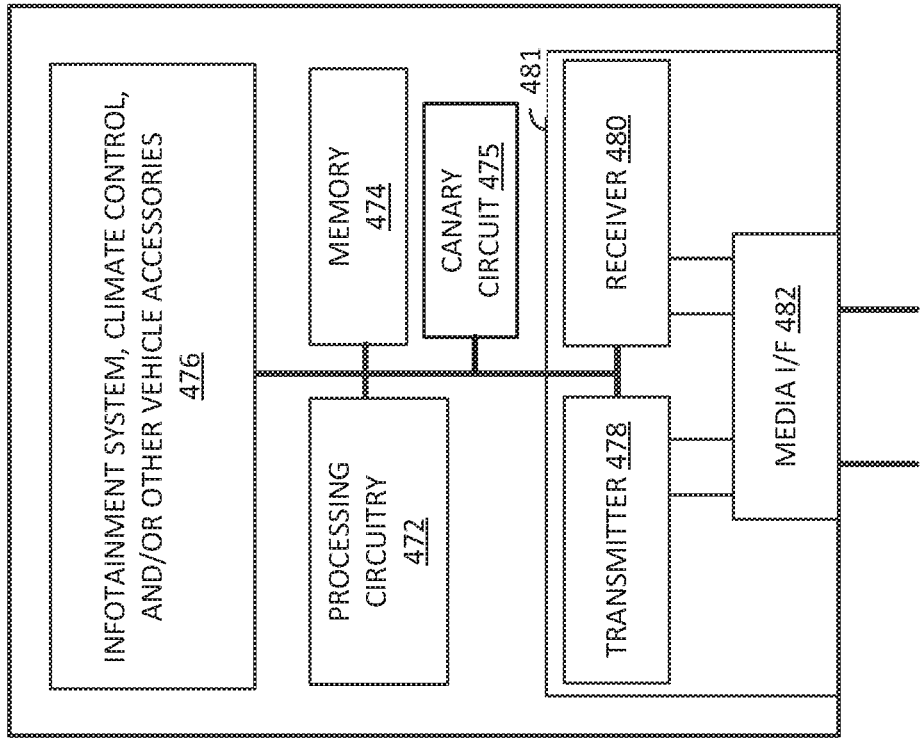
FIG. 4D is a block diagram illustrating a vehicle accessory constructed according to a described embodiment.
Figure 4C:
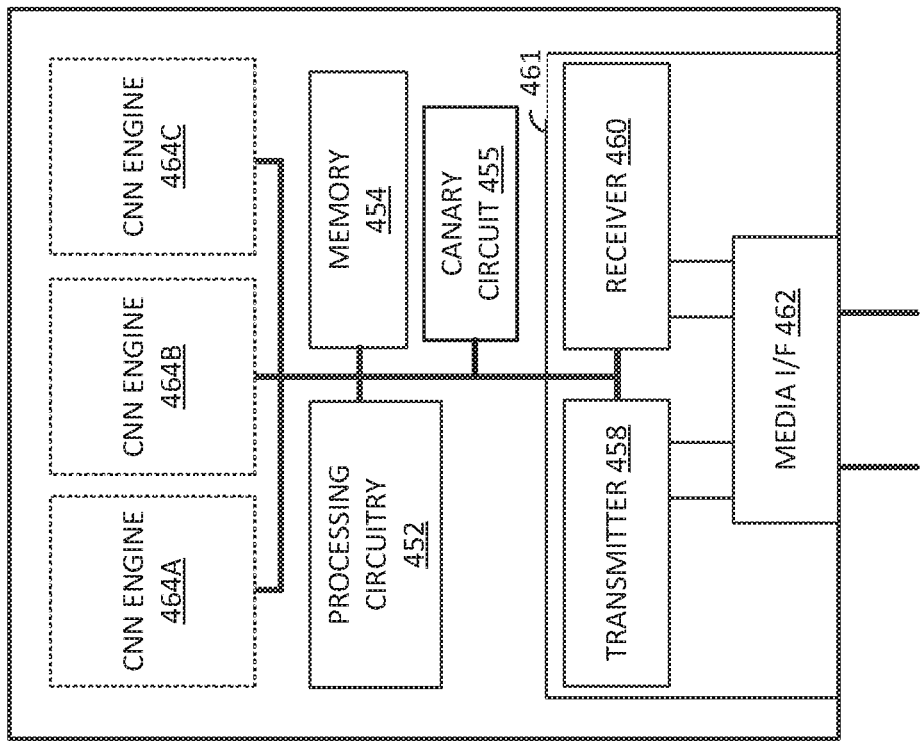
FIG. 4C is a block diagram illustrating an autonomous driving controller constructed according to a described embodiment.

FIG. 4C is a block diagram illustrating an autonomous driving controller constructed according to a described embodiment. The autonomous driving controller 210 includes processing circuitry 452, memory 454, canary circuit 455 and a transceiver 461 coupled to the processing circuitry 452 and configured to communicate with a plurality of autonomous driving sensors via the TDM bus. The autonomous driving controller 210 may also include a plurality of Convolutional Neural Network (CNN) engines 464A, 464B, and 464C that are configured to operate on autonomous driving data received from the autonomous driving sensors. The processing circuitry 452 is configured to perform autonomous driving functions and other vehicle control functions based upon the autonomous driving data, other data, and programmed operations. The transceiver 461 includes a transmitter 458, a receiver 460, and a media I/F 462 that in combination support communications via the TDM bus.

The construct of the processing circuitry 452 may be similar to the construct of the processing circuitry 402 of the autonomous driving sensor 212 but with additional processing power to service the requirements of the autonomous driving controller 210. For example, the processing circuitry 402 may include a plurality of individual processors that operate in parallel. The memory 454 may be of similar structure as the memory 404 of the autonomous driving sensor 212 but with capacity as required to support the functions of the autonomous driving controller 210.

In one aspect of operations of the autonomous driving controller 210, the processing circuitry 452 and the transceiver are configured to assign TDM bus time slots to the plurality of autonomous driving sensors and direct the plurality of autonomous driving sensors to transmit data in assigned time slots. The autonomous driving controller 310 receives first autonomous driving data from the plurality of autonomous driving sensors in assigned time slot(s). The processing circuitry 452 and the transceiver 461 are further configured to reassign TDM bus time slots to the plurality of autonomous driving sensors via communication on the TDM bus. Further, the processing circuitry 452 and the transceiver 461 are further configured to direct the plurality of autonomous driving sensors to transmit data in reassigned time slots. The autonomous driving controller 310, also operates to control the collection and transmission of performance data for the various subcomponents of the autonomous driving controller 210 including the canary circuit 455.

The canary circuit 455 can be a ring oscillator, memory device, logic circuit or other standard functional block of a system on a chip or autonomous driving control component that is implemented entirely for fault prediction and not used in normal operations of autonomous driving controller 210—but only for generating performance data for use by the fault prediction unit 225 in predicting a potential future fault. In particular, the canary circuit 455 can be designed as the least reliable circuit in the design or otherwise with less robustness than ordinary circuit blocks of the autonomous driving unit 222 so as to increase the likelihood that the canary circuit 455 will fail before the other portions of the autonomous driving controller 210. In this fashion, degradation of performance of the canary circuit 455 and/or failure can be used to predict the potential future failure of one or more remaining portions of the autonomous driving controller 210 that are used in normal operation of the vehicular autonomous driving system 200. Furthermore, while the autonomous driving controller 210 is shown as having a single canary circuit 455, the autonomous driving controller 210 may have multiple canary circuits 455, for example, one or more canary circuits 405 associated with each of the various subcomponents of the autonomous driving controller 210.

FIG. 4D is a block diagram illustrating a vehicle accessory constructed according to a described embodiment. The vehicle accessory 214 may be any of the vehicle accessories 214A-214B and includes an accessory component 476 such as an infotainment system, climate control system and/or other vehicle accessory. The vehicle accessory 214 further includes processing circuitry 472, memory 474, canary circuit 475, and a transceiver 481 coupled to the processing circuitry 472, to the memory 474, and to the accessory component 476 via a bus. The processing circuitry 472 executes programs stored in memory 474, e.g., vehicle accessory controls, reads and writes data from/to memory 474, e.g., data and instructions to support autonomous driving operations and accessory functionality, and to control the collection and transmission of performance data for the various subcomponents of the vehicle accessory 214 including the canary circuit 475, and interacts with the transceiver 481 to communicate via the TDM bus, among other operations.

The canary circuit 475 can be a ring oscillator, memory device, logic circuit or other standard functional block of a system on a chip or accessory component that is implemented entirely for fault prediction and not used in normal operations of the vehicle accessory 214—but only for generating performance data for use by the fault prediction unit 225 in predicting a potential future fault. In particular, the canary circuit 475 can be designed as the least reliable circuit in the design or otherwise with less robustness than ordinary circuit blocks of the vehicle accessory 214 so as to increase the likelihood that the canary circuit 475 will fail before the other portions of the vehicle accessory 214. In this fashion, degradation of performance of the canary circuit 475 and/or failure can be used to predict the potential future failure of one or more remaining portions of the vehicle accessory 214 that are used in normal operation of the vehicular autonomous driving system 200. Furthermore, while the vehicle accessory 214 is shown as having a single canary circuit 475, the vehicle accessory 214 may have multiple canary circuits 475, for example, one or more canary circuits 475 associated with each of the various subcomponents of the vehicle accessory 214.

By way of example and not limitation, processing circuitry 472 and memory 474 can be implemented similarly to processing circuit 402 and memory 404. The transceiver 481 includes a transmitter 478, a receiver 480, and a media I/F 482. The media I/F 482 may be a transmit/receive (T/R) switch, a duplexer, or other device that supports the illustrated coupling. In other embodiments, both the transmitter 478 and receiver 480 couple directly to the TDM bus or couple to the TDM bus other than via the media I/F 482.

Figure 4E:
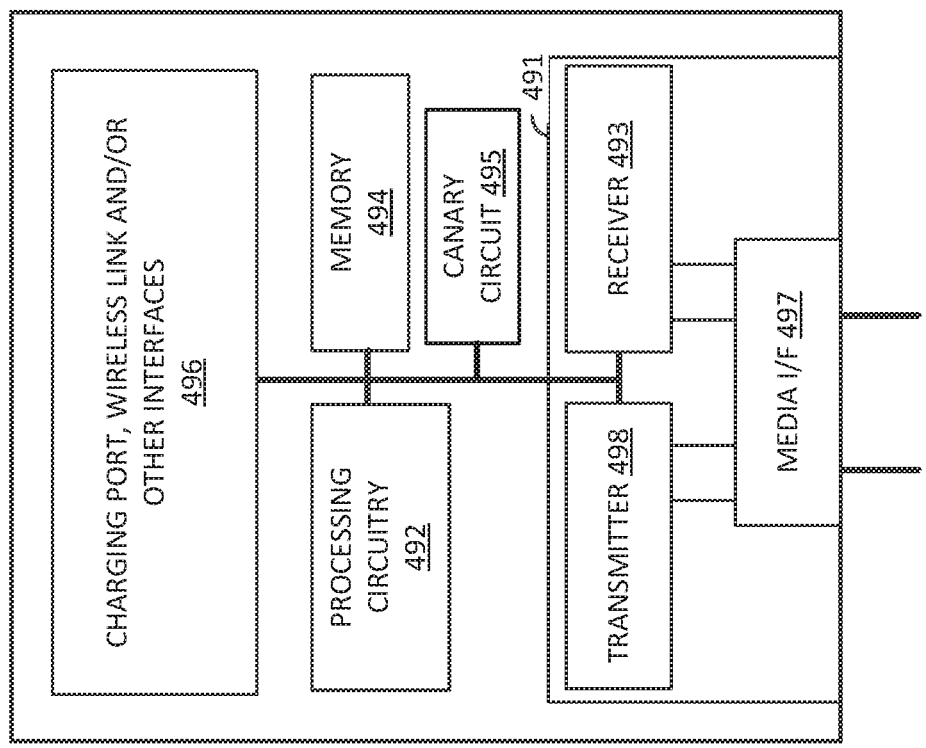
FIG. 4E is a block diagram illustrating a vehicle interface constructed according to a described embodiment.

FIG. 4E is a block diagram illustrating a vehicle interface constructed according to a described embodiment. The interface 218 may be any of the vehicle accessories 218A-218B and includes an interface component 496 such as a charging port, wireless link or other wired or wireless interface. The interface 218 further includes processing circuitry 492, memory 494, canary circuit 495, and a transceiver 491 coupled to the processing circuitry 492, to the memory 494, and to the accessory component 476 via a bus. The processing circuitry 492 executes programs stored in memory 494, e.g., vehicle accessory controls, reads and writes data from/to memory 494, e.g., data and instructions to support autonomous driving operations and interface functionality, and to control the collection and transmission of performance data for the various subcomponents of the interface 218 including the canary circuit 495, and interacts with the transceiver 491 to communicate via the TDM bus, among other operations.

The canary circuit 495 can be a ring oscillator, memory device, logic circuit or other standard functional block of a system on a chip or accessory component that is implemented entirely for fault prediction and not used in normal operations of the interface 218—but only for generating performance data for use by the fault prediction unit 225 in predicting a potential future fault. In particular, the canary circuit 495 can be designed as the least reliable circuit in the design or otherwise with less robustness than ordinary circuit blocks of the interface 218 so as to increase the likelihood that the canary circuit 495 will fail before the other portions of the interface 218. In this fashion, degradation of performance of the canary circuit 495 and/or failure can be used to predict the potential future failure of one or more remaining portions of the interface 218 that are used in normal operation of the vehicular autonomous driving system 200. Furthermore, while the interface 218 is shown as having a single canary circuit 495, the interface 218 may have multiple canary circuits 495, for example, one or more canary circuits 495 associated with each of the various subcomponents of the interface 218.

By way of example and not limitation, processing circuitry 492 and memory 494 can be implemented similarly to processing circuit 402 and memory 404. The transceiver 491 includes a transmitter 498, a receiver 493, and a media I/F

497. The media I/F 497 may be a transmit/receive (T/R) switch, a duplexer, or other device that supports the illustrated coupling. In other embodiments, both the transmitter 498 and receiver 493 couple directly to the TDM bus or couple to the TDM bus other than via the media I/F 497.

Figure 5A:
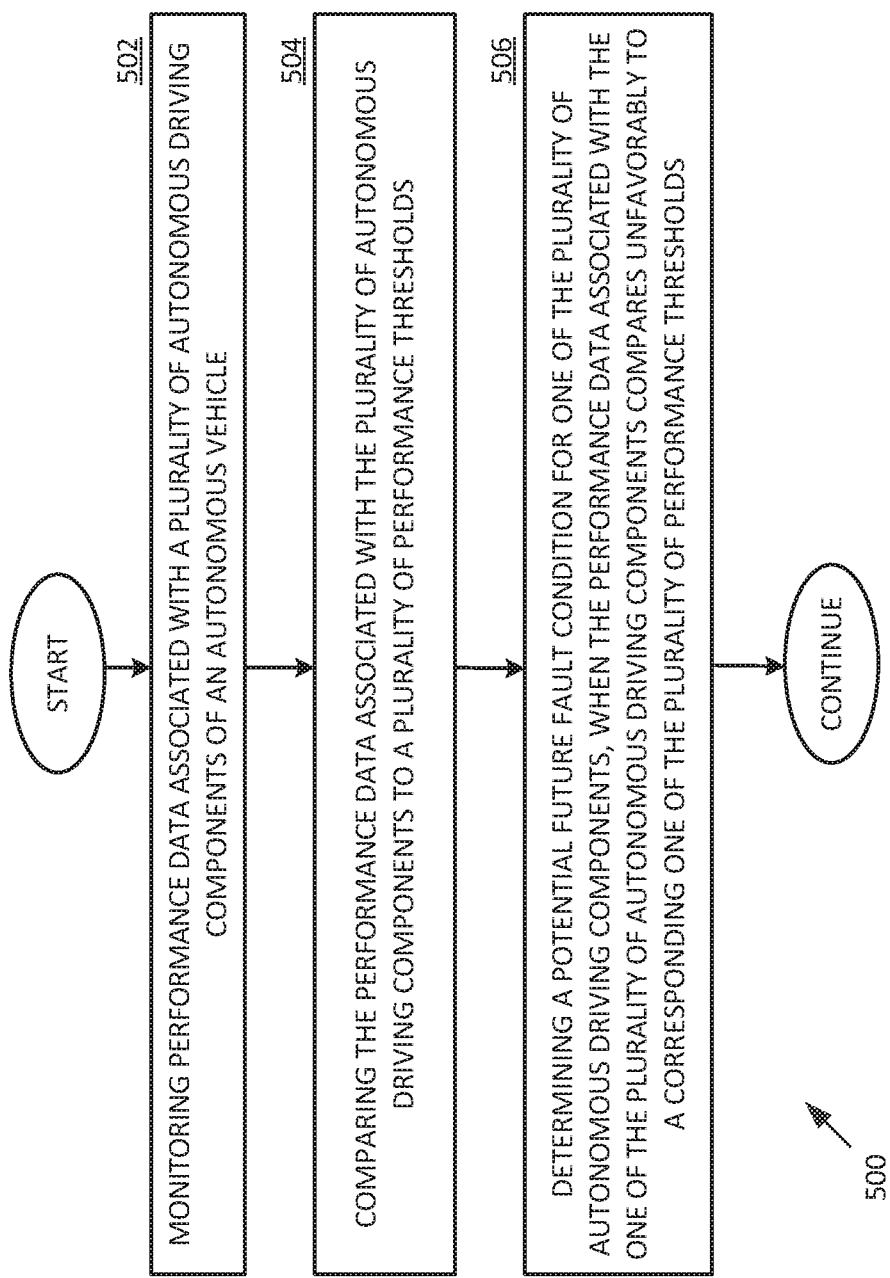
FIG. 5A is a flow diagram illustrating a method according to one or more described embodiments.

FIG. 5A is a flow diagram 500 illustrating a method according to one or more described embodiments. In particular, a method is presented for use with one or more functions and features described in conjunction with FIGS. 1-2, 3A-3F and 4A-4E. Step 502 includes monitoring performance data associated with a plurality of autonomous driving components of an autonomous vehicle. Step 504 includes comparing the performance data associated with the plurality of autonomous driving components to a plurality of performance thresholds. Step 506 includes determining a potential future fault condition for one of the plurality of autonomous driving components, when the performance data associated with the one of the plurality of autonomous driving components compares unfavorably to a corresponding one of the plurality of performance thresholds.

In various embodiments, the performance data associated with at least one of the plurality of autonomous driving components includes component characteristic data measured over time and wherein comparing the performance data associated with the at least one of the plurality of autonomous driving components to a corresponding at least one of the plurality of performance thresholds includes determining a deviation between the component characteristic data measured over time and a corresponding nominal characteristic data and comparing the deviation between the component characteristic data measured over time and the corresponding nominal characteristic data to the corresponding at least one of the plurality of performance thresholds. The nominal characteristic data can be determined via machine learning. The corresponding at least one of the plurality of performance thresholds can be set based on an amount of likelihood that an amount of deviation between the component characteristic data measured over time and the corresponding nominal characteristic data indicates a future fault in the at least one of the plurality of autonomous driving components. The amount of likelihood can be set based on a relative importance of the at least one of the plurality of autonomous driving components to autonomous driving. The amount of likelihood can be set to a first likelihood for a first of the plurality of autonomous driving components to autonomous driving of high relative importance to autonomous driving and wherein the amount of likelihood is set to a second likelihood for a second of the plurality of autonomous driving components of low relative importance to autonomous driving and wherein the first likelihood is less than the second likelihood.

In various embodiments, the component characteristic data can includes a hardware-specific characteristic and/or a software-specific characteristic. An indication of the potential future fault condition can be transmitted to a diagnostic unit via a wireless communication link or via a charging port of the autonomous vehicle. Further, the plurality of autonomous driving components can include a plurality of autonomous driving units that control motion of the autonomous vehicle, a plurality of autonomous driving sensors coupled to the autonomous driving controller and configured to collect autonomous driving data and transmit the autonomous driving data to the autonomous driving controller and an autonomous driving controller configured to control the plurality of autonomous driving units of the autonomous vehicle.

FIG. 5B is a flow diagram 510 illustrating a method according to one or more described embodiments. In particular, a method is presented for use with one or more functions and features described in conjunction with FIGS. 1-2, 3A-3F and 4A-4E. Step 512 includes monitoring performance data associated with a canary circuit included in each of a plurality of autonomous driving components of an autonomous vehicle. Step 514 includes comparing the performance data associated with the canary circuit included in each of the plurality of autonomous driving components to a plurality of performance thresholds. Step 516 includes determining a potential future fault condition for one of the plurality of autonomous driving components, when the performance data associated with one of the plurality of canary circuits included in the one of the plurality of autonomous driving components compares unfavorably to a corresponding one of the plurality of performance thresholds.

In various embodiments, the performance data associated with the at least one of the plurality of canary circuits includes a component characteristic data measured over time and wherein comparing the performance data associated with the at least one of the plurality of canary circuits to a corresponding at least one of the plurality of performance thresholds includes determining a deviation between the component characteristic data measured over time and a corresponding nominal characteristic data and comparing the deviation between the component characteristic data measured over time and the corresponding nominal characteristic data to the corresponding at least one of the plurality of performance thresholds. The nominal characteristic data can be determined via machine learning.

In various embodiments, the corresponding at least one of the plurality of performance thresholds is set based on an amount of likelihood that an amount of deviation between the component characteristic data measured over time and the corresponding nominal characteristic data indicates a future fault in the at least one of the plurality of autonomous driving components. The amount of likelihood can be set based on a relative importance of the at least one of the plurality of autonomous driving components to autonomous driving. The amount of likelihood can be set to a first likelihood for a first of the plurality of autonomous driving components to autonomous driving of high relative importance to autonomous driving and wherein the amount of likelihood is set to a second likelihood for a second of the plurality of autonomous driving components of low relative importance to autonomous driving and wherein the first likelihood is less than the second likelihood.

In various embodiments, the component characteristic data can include a hardware-specific characteristic and/or a software-specific characteristic the canary circuit. The canary circuit included in each of the plurality of autonomous driving components can be designed to fail before the each of the plurality of autonomous driving components. An indication of the potential future fault condition can be transmitted to a diagnostic unit via a wireless communication link or via a charging port of the autonomous vehicle. Further, plurality of autonomous driving components can include a plurality of autonomous driving units that control motion of the autonomous vehicle, a plurality of autonomous driving sensors coupled to the autonomous driving controller and configured to collect autonomous driving data and transmit the autonomous driving data to the autonomous driving controller and an autonomous driving controller configured to control the plurality of autonomous driving units of the autonomous vehicle.

Figure 5C:
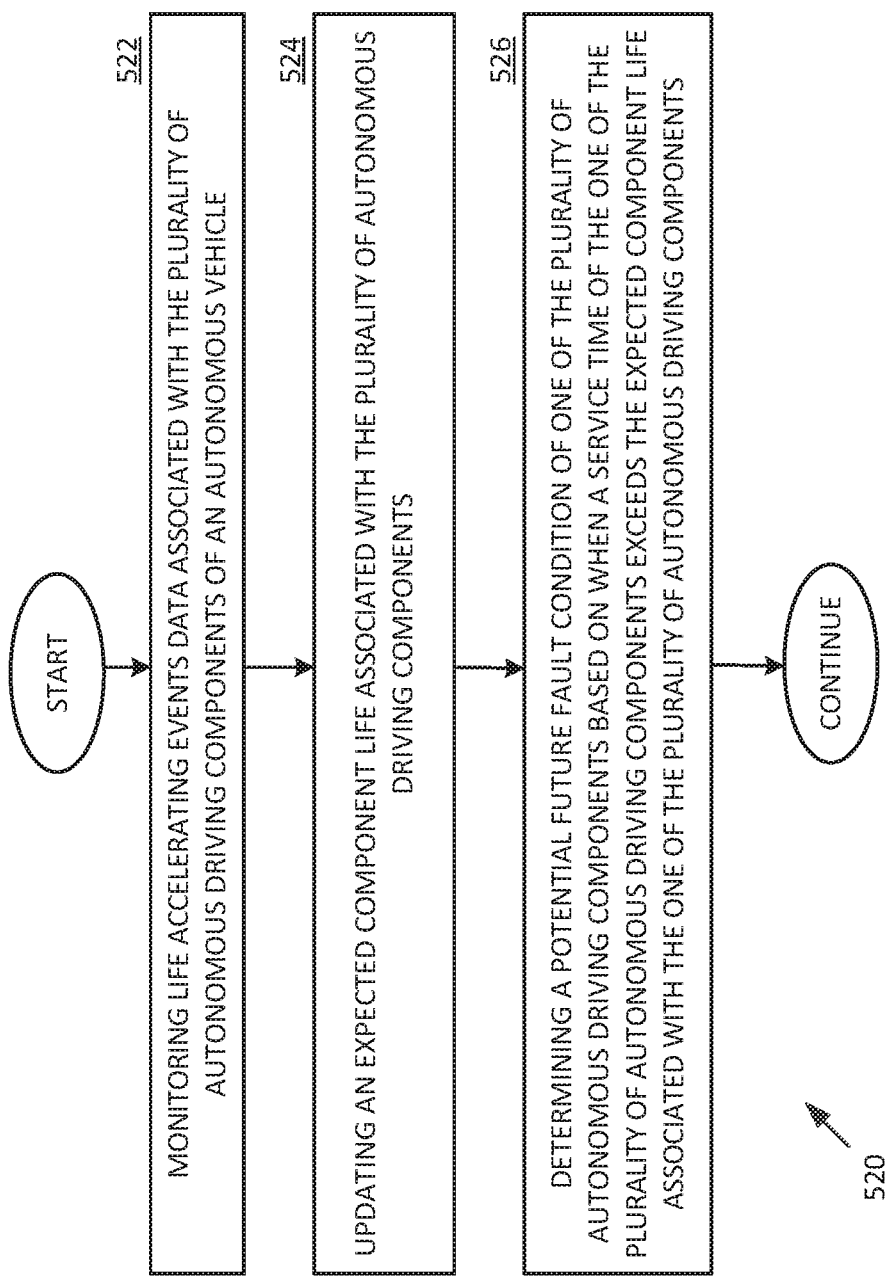
FIG. 5C is a flow diagram illustrating a method according to one or more described embodiments.

FIG. 5C is a flow diagram 520 illustrating a method according to one or more described embodiments. In particular, a method is presented for use with one or more functions and features described in conjunction with FIGS. 1-2, 3A-3F and 4A-4E. Step 522 includes monitoring life accelerating events data associated with the plurality of autonomous driving components of an autonomous vehicle. Step 524 includes updating an expected component life associated with the plurality of autonomous driving components. Step 526 includes determining a potential future fault condition of one of the plurality of autonomous driving components based on when a service time of the one of the plurality of autonomous driving components exceeds the expected component life associated with the one of the plurality of autonomous driving components.

In various embodiments, the life accelerating events data includes an indication of one of a plurality of life accelerating events and an indication of one or more of the plurality of autonomous driving components associated with the life accelerating event. The plurality of life accelerating events can include an indication of an over-voltage condition, a voltage spike a current spike a high operating temperature or a low operating temperature. Determining the potential future fault condition of one of the plurality of autonomous driving components can include: executing a stress test, when the service time of the one of the plurality of autonomous driving components exceeds the expected component life associated with the one of the plurality of autonomous driving components; and determining the potential future fault condition of one of the plurality of autonomous driving components when stress test results compare unfavorably to a stress test threshold.

In various embodiments, the method can further include: executing a stress test to generate stress test results; and comparing stress test results to a stress test threshold; wherein determining the potential future fault condition of one of the plurality of autonomous driving components is further based on the stress test results compare unfavorably to the stress test threshold. Updating the expected component life associated with the plurality of autonomous driving components can include decreasing the expected component life associated with a selected one of the plurality of autonomous driving components in response to the life accelerating events data indicating a life accelerating event associated with the selected one of the plurality of autonomous driving components. An indication of the potential future fault condition can be transmitted to a diagnostic unit via a wireless communication link and/or via a charging port of the autonomous vehicle. The plurality of autonomous driving components can include a plurality of autonomous driving units that control motion of the autonomous vehicle, a plurality of autonomous driving sensors coupled to the autonomous driving controller and configured to collect autonomous driving data and transmit the autonomous driving data to the autonomous driving controller and an autonomous driving controller configured to control the plurality of autonomous driving units of the autonomous vehicle.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" or "processing circuitry" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the invention. As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, application specific integrated circuit, state machine, logic circuitry, analog circuitry, digital circuitry, optical, chemical, biological, quantum or nano-engineered systems, components and mechanisms and/or any other device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting.

What is claimed is:

1. A vehicular autonomous driving system comprising:
   a plurality of autonomous driving components including:
      a plurality of autonomous driving units that control motion of a vehicle;
      an autonomous driving controller configured to control the plurality of autonomous driving units of the vehicle;
      a plurality of autonomous driving sensors coupled to the autonomous driving controller and configured to collect autonomous driving data and transmit the autonomous driving data to the autonomous driving controller;
   a fault prediction unit, including a processor and memory, configured to predict a potential future fault condition by:
      monitoring performance data associated with the plurality of autonomous driving components;
      comparing the performance data associated with the plurality of autonomous driving components to a plurality of performance thresholds; and
      determining the potential future fault condition for one of the plurality of autonomous driving components, when the performance data associated with the one of the plurality of autonomous driving components compares unfavorably to a corresponding one of the plurality of performance thresholds,
      wherein the fault prediction unit is configured to execute a stress test for the one of the plurality of autonomous driving components, and wherein the stress test comprises one or more of applying a higher operating frequency or an over-voltage condition.

2. The vehicular autonomous driving system of claim 1, wherein the performance data associated with at least one of the plurality of autonomous driving components includes component characteristic data measured over time and wherein comparing the performance data associated with the at least one of the plurality of autonomous driving components to a corresponding at least one of the plurality of performance thresholds includes determining a deviation between the component characteristic data measured over time and a corresponding nominal characteristic data and comparing the deviation between the component characteristic data measured over time and the corresponding nominal characteristic data to the corresponding at least one of the plurality of performance thresholds.

3. The vehicular autonomous driving system of claim 2, wherein the nominal characteristic data is determined by the fault prediction unit via machine learning.

4. The vehicular autonomous driving system of claim 2, wherein the corresponding at least one of the plurality of performance thresholds is set based on an amount of likelihood that an amount of deviation between the component characteristic data measured over time and the corresponding nominal characteristic data indicates a future fault in the at least one of the plurality of autonomous driving components.

5. The vehicular autonomous driving system of claim 4, wherein the amount of likelihood is set based on a relative importance of the at least one of the plurality of autonomous driving components to autonomous driving.

6. The vehicular autonomous driving system of claim 4, wherein the amount of likelihood is set to a first likelihood for a first of the plurality of autonomous driving components to autonomous driving of high relative importance to autonomous driving and wherein the amount of likelihood is set to a second likelihood for a second of the plurality of autonomous driving components of low relative importance to autonomous driving and wherein the first likelihood is less than the second likelihood.

7. The vehicular autonomous driving system of claim 2, wherein the component characteristic data includes a hardware-specific characteristic.

8. The vehicular autonomous driving system of claim 2, wherein the component characteristic data includes a software-specific characteristic.

9. The vehicular autonomous driving system of claim 1, wherein an indication of the potential future fault condition is transmitted to a diagnostic unit via a wireless communication link or via a charging port of the vehicle.

10. The vehicular autonomous driving system of claim 1, wherein plurality of autonomous driving components further include components of at least one vehicle accessory.

11. A method implemented by a fault prediction unit included in a vehicle, the method comprising:
    monitoring performance data associated with a plurality of autonomous driving components of an autonomous vehicle;
    comparing the performance data associated with the plurality of autonomous driving components to a plurality of performance thresholds; and
    determining a potential future fault condition for one of the plurality of autonomous driving components, when the performance data associated with the one of the plurality of autonomous driving components compares unfavorably to a corresponding one of the plurality of performance thresholds, wherein the fault prediction unit is configured to execute a stress test for the one of the plurality of autonomous driving components, and wherein the stress test comprises one or more of applying a higher operating frequency or an over-voltage condition.

12. The method of claim 11, wherein the performance data associated with at least one of the plurality of autonomous driving components includes component characteristic data measured over time and wherein comparing the performance data associated with the at least one of the plurality of autonomous driving components to a corresponding at least one of the plurality of performance thresholds includes determining a deviation between the component characteristic data measured over time and a corresponding nominal characteristic data and comparing the deviation between the component characteristic data measured over time and the corresponding nominal characteristic data to the corresponding at least one of the plurality of performance thresholds.

13. The method of claim 12, wherein the nominal characteristic data is determined via machine learning.

14. The method of claim 12, wherein the corresponding at least one of the plurality of performance thresholds is set based on an amount of likelihood that an amount of deviation between the component characteristic data measured over time and the corresponding nominal characteristic data indicates a future fault in the at least one of the plurality of autonomous driving components.

15. The method of claim 14, wherein the amount of likelihood is set based on a relative importance of the at least one of the plurality of autonomous driving components to autonomous driving.

16. The method of claim 14, wherein the amount of likelihood is set to a first likelihood for a first of the plurality of autonomous driving components to autonomous driving of high relative importance to autonomous driving and wherein the amount of likelihood is set to a second likelihood for a second of the plurality of autonomous driving components of low relative importance to autonomous driving and wherein the first likelihood is less than the second likelihood.

17. The method of claim 12, wherein the component characteristic data includes a hardware-specific characteristic.

18. The method of claim 12, wherein the component characteristic data includes a software-specific characteristic.

19. The method of claim 11, wherein an indication of the potential future fault condition is transmitted to a diagnostic unit via a wireless communication link or via a charging port of the autonomous vehicle.

20. Non-transitory computer storage media storing instructions that when executed by one or more processors, cause the one or more processors to perform operations:
- monitoring performance data associated with a plurality of autonomous driving components;
- comparing the performance data associated with the plurality of autonomous driving components to a plurality of performance thresholds; and
- determining a potential future fault condition for one of the plurality of autonomous driving components, when the performance data associated with the one of the plurality of autonomous driving components compares unfavorably to a corresponding one of the plurality of performance thresholds, wherein determining the potential future fault condition is based on execution of a stress test for the one of the plurality of autonomous driving components, and wherein the stress test comprises one or more of applying a higher operating frequency or an over-voltage condition.

* * * * *